July 18, 1961     B. F. RICHER, JR., ET AL     2,993,136
DYNAMOELECTRIC MACHINE

Filed Oct. 1, 1958     2 Sheets-Sheet 1

WITNESSES:
Bernard R. Gieguey
Ernest P. Klipfel

INVENTORS
Benjamin F. Richer, Jr. and
Robert E. Morey.
BY
ATTORNEY 2,993,136
DYNAMOELECTRIC MACHINE
Benjamin F. Richer, Jr., Shawnee, and Robert E. Morey, Russels Point, Ohio, assignors to Westinghouse Electric Corporation, East Pittsburgh, Pa., a corporation of Pennsylvania
Filed Oct. 1, 1958, Ser. No. 764,708
5 Claims. (Cl. 310—258)

This invention relates to dynamoelectric machines, and particularly relates to an improved stator construction for use in single phase induction motors of the split phase type.

The usual construction of dynamoelectric machines has a stator member made up of laminations of magnetic material with a plurality of equispaced identically shaped slots within which winding conductors are placed. Identically shaped slots are quite satisfactory for polyphase machines or any type of machine using a winding having essentially the same amount of conductor material in each slot. However, such is not the case in the split-phase type of machine which has a main winding and auxiliary winding displaced from each other on the stator member. In split phase motors, the auxiliary or starting winding is wound with smaller size wire so it will have higher electrical resistance in order to attain the necessary phase displacement between the currents in the main and auxiliary windings.

For this reason in a split-phase type of machine the main winding comprises a much larger bulk of conductor material than the starting winding. To accommodate the different size windings, and to improve starting performance, the split-phase stator sometimes has slots of more shallow depth for the auxiliary or starting winding as compared to the main winding slots. The shallow slots, however, do not allow optimum use of magnetic material nor provide for ease of winding conducting material on the stator. The shape of the slots has also sometimes been varied to permit use of a square-shaped lamination in the stator, but here again, optimum use of magnetic and conductor material is not attained and the slot configuration used often hinders winding.

Another problem in split phase motor construction is the winding of the conductors onto the core, the ease of winding being affected by the "pressure angle." The pressure angle for each slot is determined by the intersection of the radial center line of a magnetic pole with a plane lying on the slot side nearer the radial center line of the pole. If the plane in which a particular slot side lies intersects the radial center line of the pole at a rather large angle, the conductors being wound in that slot will have a tendency to be forced out of the slot. On the other hand, if the plane in which the particular slot side lies intersects the radial center line of the pole with a relatively small angle, then the conductors of the winding will more completely fill up that particular slot, facilitating winding the stator. At the same time, more effective use will be made of the magnetic and conductor material within the stator core over the conventional core.

The principal object of our invention is to provide a dynamoelectric machine having a stator construction allowing optimum use of conductor and magnetic material.

Another object of our invention is to provide a dynamoelectric machine having a stator construction allowing maximum ease of winding.

Another object of our invention is to provide a dynamoelectric machine having a stator construction reducing the amount of conductor material in the end turns, thereby improving the ratio of effective to actual length of conductors in the stator.

Further objects and advantages of our invention will be more fully understood from the following detailed description, taken in connection with the accompanying drawing, in which.

Figure 1:
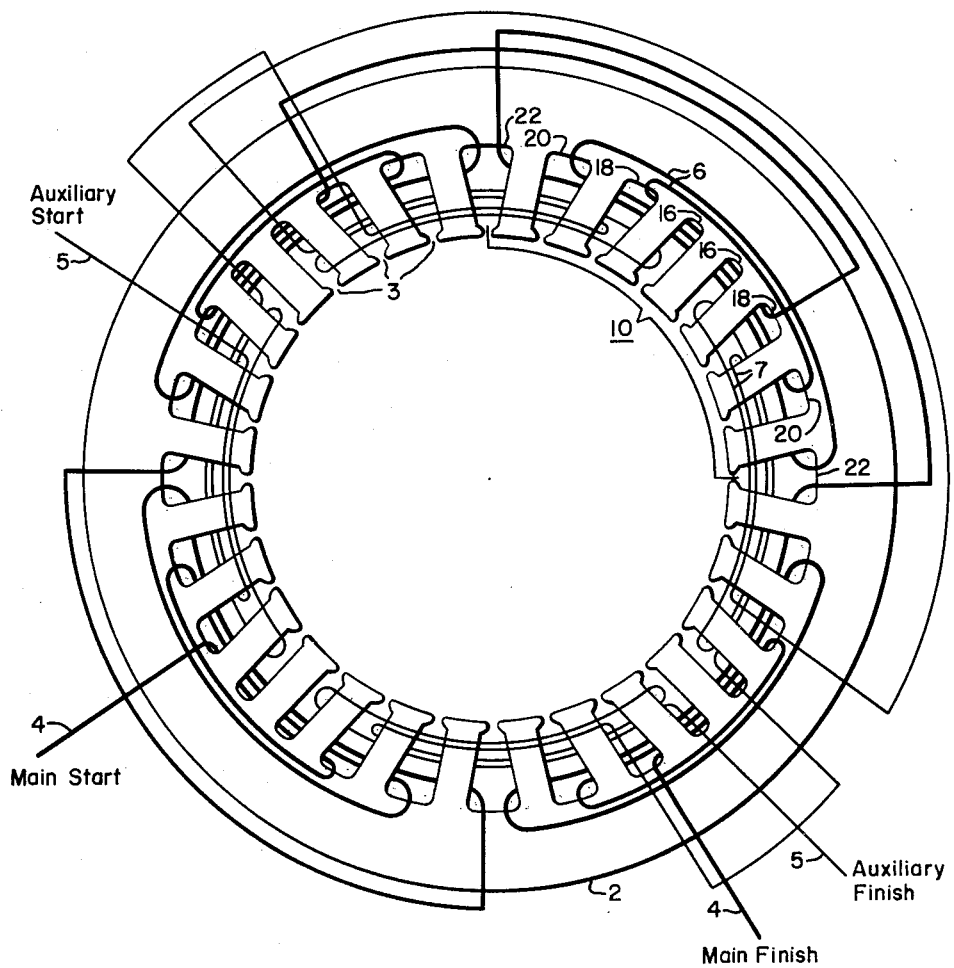
FIGURE 1 is a front view of a stator embodying our invention with the main and auxiliary windings in position in the slots of the stator core.

The invention is generally applicable to any split-phase dynamoelectric machine and is shown in the drawing embodied in a stator for a split-phase induction motor having a laminated core 2 for use with a squirrel-cage rotor, not shown. The stator core 2 has a plurality of slots 3 peripherally spaced around the bore of the stator core 2. Each slot 3 has its opening on the stator bore equidistantly spaced from the adjacent slots. For purposes of clarity, the slots of the stator core 2 are shown as being divided into groups 14 of slots 3 corresponding to the magnetic poles 10 formed on the core 2 by a multipolar main winding 4. Each group 14 consists of a plurality of slots 3 symmetrically disposed about a radial center line 12. A four pole machine has been illustrated although it is to be understood that any number of poles may be used. For the illustrated four pole machine, each group 14 is equivalent to a quadrant of the core 2.

Figure 2:
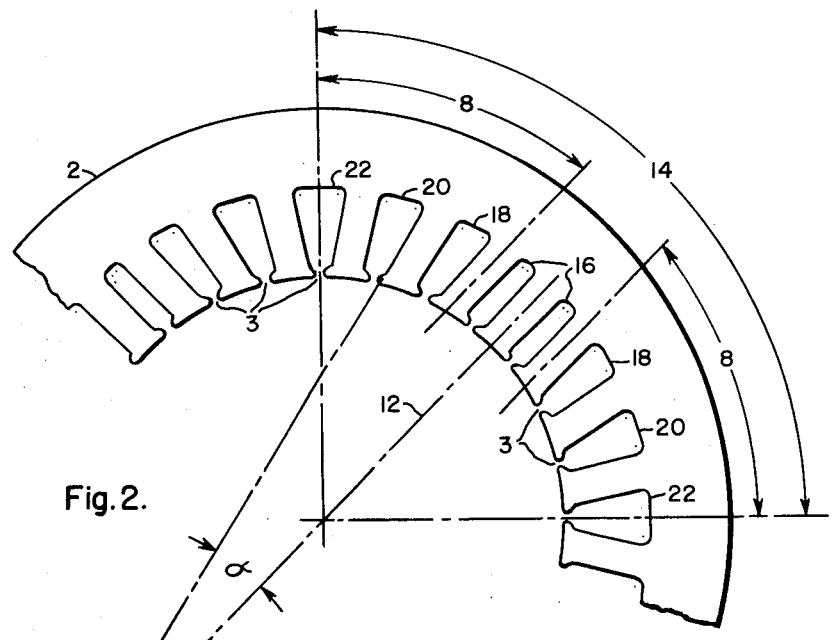
FIG. 2 is a fragmentary view of the stator core of FIG. 1 with the windings removed.

Referring to FIG. 2, each group 14 of slots 3 comprises a first pair of slots 16 adjacent to the radial center line 12 with one slot 16 on each side of the radial center line 12. Successive pairs of slots indicated at 18, 20 and 22 are symmetrically disposed about the center line 12 and have one slot on one side of the radial center line 12 and the other slot on the other side of the radial center line 12.

For purposes of clarity, each group 14 may be said to contain a lesser number of slots designated as a subgroup 8. The subgroup comprises the successive pairs of slots 18, 20 and 22. As shown in FIG. 1, a multipolar main winding 4 is wound on the stator core 2 with a plurality of interconnected concentric coils 6 disposed in each subgroup 8 of slots thereby forming a magnetic pole 10 embracing a subgroup 8 and the first pair of slots 16 which complete a group 14. Each group 14 corresponds to a magnetic pole 10 with its magnetic center line corresponding to the center line 12 of the group 14 of slots.

The coils 6 of each magnetic pole 10 are disposed within the slots comprising a subgroup 8 which is made up of successive pairs of slots as indicated at 18, 20 and 22. The first pair of slots 16 adjacent the radial center line 12 of the magnetic pole 10 contains no coils 6 of the main winding 4 and, therefore, has been excluded from the subgroup 8. The first pair of slots 16, however, is included in the group 14 which defines a magnetic pole.

A starting or auxiliary winding 5 has concentric coils 7 wound on the core 2 so as to be angularly displaced by ninety electrical degrees from the main winding 4. The coils 7 are shown as being inserted in the slots 16 and slots 18 of different groups 14.

As mentioned previously, the primary object of our invention is to provide a stator allowing optimum use of conductor material and magnetic material. Such a stator should not penalize or make difficult the winding of conductors on the stator core 2.

In accordance with our invention, the first pair of slots 16 of each group are formed so that their sides closest to the center line 12 are parallel thereto. Successive pairs of slots 18, 20 and 22 have pressure angles α which increase in small increments as the distance of the respective pair of slots from the center line 12 increases. With this arrangement, the slot sides nearest the radial center line 12 in each group 14 are progressively inclined to reduce the pressure angles α, as compared to the pressure angles of the conventional generally radial tooth sides, thereby allowing more conductor material to be contained within each slot 3 without the conductors being forced from the slots during the winding of the core 2.

It is to be noted that the outer boundary of each magnetic pole 10 is located on the center of a slot rather than the center of a tooth. This results in the slots 22 each being trapezoidal in shape and common to two groups 14. If the outer boundary of a magnetic pole 10 were located on a tooth, a trapezoidal tooth would result with wasted magnetic material not only in that tooth but the other teeth in each group 14 as well. With the outer boundary of the magnetic pole 10 located on the center of a slot, the sides of each slot 3 of each group 14 may be inclined to approach being parallel to the radial center line 12. With the slot sides closest the center line thus lying in planes substantially parallel to the center line of the magnetic pole 10, the pressure angles α are reduced, thereby allowing more conductor material to be contained within the slots 3 without the conductors being forced from the slots 3.

Each pair of slots has increasingly larger winding area the further each pair is displaced from the radial center line 12. This is so even though the slot openings are equidistantly spaced from the adjacent slots. By this arrangement of slots 3, the slots which have the largest winding area, indicated as the last pair of slots 22, contain the coil conductors of the full-pitch coils of two adjacent magnetic poles 10 located in separate sections 14. Since the slots 22 contain the largest number of conductors and have slot sides as nearly parallel to the center lines of adjacent magnetic poles as they can practically be made, the ratio of effective conductors to actual conductors is greatly improved over the conventional radial slot core. The intermediate sized slots with intermediate winding area contain sufficient area not only to receive auxiliary winding conductors but also to receive a reduced quantity of main winding conductors. The intermediate sized slots receive a sufficient number of main winding coils to obtain a satisfactory distribution of the conductors within the subgroup 8 to prevent excessive harmonic content in the air gap flux. The first pair of slots 16 have the smallest winding area and are reserved for auxiliary winding conductors only. Since the auxiliary winding comprises a much smaller bulk of conductor material than the main winding, the smaller starting winding slots, shown as the first pair of slots 16 in FIG. 2, allow optimum use of the magnetic material of the core.

Thus, it can be seen that the stator 2 has been provided with a slot configuration wherein the slots required to contain the larger portion of the conductor material have been provided with a larger winding area while those slots requiring a lesser amount of conductors are reduced in winding area proportionately to the amount of conductors they must contain, thus, making most effective use of the conductor and magnetic material.

At the same time, the pairs of slots distributed about the radial center line of each magnetic pole 10 and which comprise a group 14, have their slot sides nearest the radial center line 12 angularly displaced in small increasing increments from a line parallel to the center line. In such a manner the coils 6 and coils 7 can fill the slots to the desired level without the conductors being forced out of the slots by a large pressure angle α. This allows the effective use of the conductor material where it is needed most and most effective use of the magnetic material where the number of conductors is reduced or the size of the conductors are smaller such as in the auxiliary winding coils.

The advantages of such an arrangement results in a smaller stator by a reduction in the number of laminations required, thereby reducing the axial length of the core. Less conductor material is used without sacrificing performance since the slot openings and tooth faces remain equispaced. The reduction in pressure angle α allows the use of less conductor material in the end turns, as compared to the radial slots used in conventional constructions of the same power rating. Tooling and die costs are reasonable since the pairs of slots 16, 18, 20 and 22 are mirror images of each other about the radial center line 12.

Figure 3:
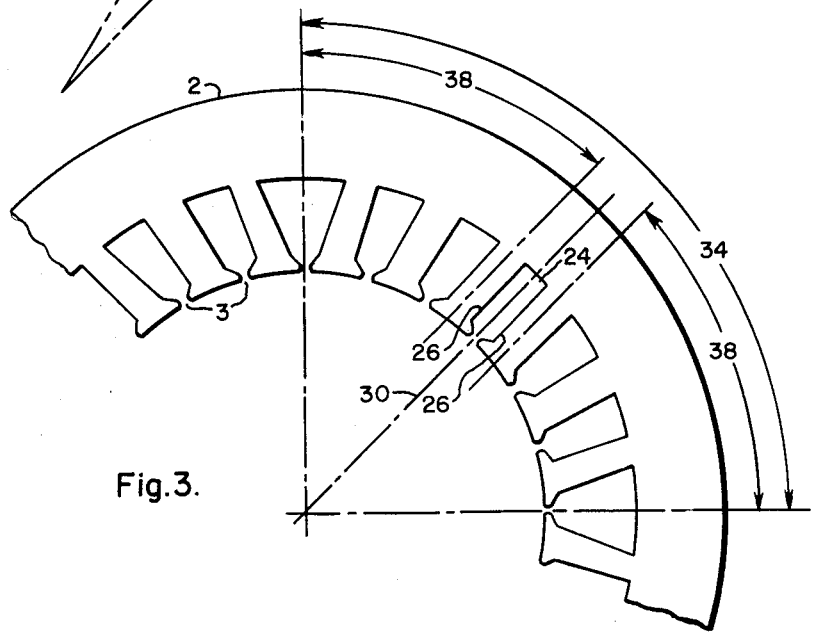
FIG. 3 is a fragmentary view of an alternate embodiment of our invention.

The radial center line 12 of a magnetic pole 10 need not fall on the center of a tooth to be a part of our invention. With a number of stator slots providing an even number of slots per magnetic pole 10 in a given group 14, the center of the pole and, therefore, its radial center line will fall on the center of a slot. This is shown in FIG. 3. With the slots arranged as shown in FIG. 3, a first slot 24 has its slot sides 26, one on each side thereof, parallel to the radial center line 30. Successive pairs of slots, with each slot located on opposite sides of the radial center line of the pole, would once again be mirror images one to the other and make up a subgroup of slots wherein the coils of one pole of the multipolar winding would be located.

With the arrangement as shown in FIG. 3, a group 34 of slots includes the single slot 24 and a subgroup 38 of slots containing the main winding. The slot 24 contains only the conductors of two adjacent auxiliary winding poles, which conductors are that portion of the auxiliary winding located ninety electrical degrees from the center of each auxiliary pole. The main winding is wound in the remaining slots in the same manner as in FIG. 1. The slot sides nearest the radial center line 30, of each pair of slots are once again angularly displaced in small increasing increments from a line parallel to said center line, as previously described.

Thus, our invention has provided a stator configuration making maximum use of conductor material as well as magnetic material. The winding of the coils of each winding has been simplified and made easier by reducing the pressure angle α which tends to force the conductors out of the slots. The slots have been arranged in size so that they will have sufficient winding area to receive the required number of conductors of the main winding 4 to provide satisfactory winding distribution to prevent excessive harmonics. At the same time the slots of each pair are made mirror images one to the other thereby reducing the tooling and die costs. A shorter core using less conductor material can be used in this stator without sacrificing performance since the slot openings and tooth faces are still equispaced.

While this invention has been described with a certain degree of particularity, it is to be understood that the invention is not limited to these specific arrangements and in its broadest aspects, it includes all equivalents, embodiments and modifications which come within the spirit and scope of our invention. The sides of the slots of each group might all be made parallel to the radial center line. Such a construction would be relatively expensive, however, since each of the slots of each group or magnetic pole would have a different configuration, requiring separate punches for each slot. Further, it is to be understood that any number of slots per group may be used in our invention since our invention is not limited to any specific number of slots in the stator core.

We claim as our invention:

1. A stator member for a single-phase electric motor comprising a laminated core having a plurality of equally spaced, generally radial slots for the reception of windings, all of said slots being of the same radial depth, said slots being arranged in a plurality of identical groups, the slots of each group being symmetrical with respect to the radial center line of the group, and the sides of the slots of each group forming small angles with the center line of the group which increase with the distance of the slot from the center line.

2. A stator member for a single-phase electric motor comprising a laminated core having a plurality of equally spaced, generally radial slots for the reception of windings, all of said slots being of the same radial depth, said slots being arranged in a plurality of identical groups, the slots of each group being symmetrical with respect to the radial center line of the group, the area of said slots increasing with the distance of the slot from the center line of the group, and the sides of the slots of each group forming small angles with the center line of the group which increase with the distance of the slot from the center line.

3. A stator member for a single-phase electric motor comprising a laminated core having a plurality of equally spaced, generally radial slots for the reception of windings, all of said slots being of the same radial depth, said slots being arranged in a plurality of identical groups, the slots of each group being symmetrical with respect to the radial center line of the group, the area of said slots increasing with the distance of the slot from the center line of the group, and the sides of the slots of each group forming small angles with the center line of the group which increase with the distance of the slot from the center line, the outermost slots of each group being common with the adjacent groups and being of trapezoidal cross-section.

4. A stator member for a single-phase electric motor comprising a laminated core having a plurality of equally spaced, generally radial slots for the reception of windings, all of said slots being of the same radial depth, said slots being arranged in a plurality of identical groups, the slots of each group being symmetrical with respect to the radial center line of the group, the area of said slots increasing with the distance of the slot from the center line of the group, and the sides of the slots of each group forming small angles with the center line of the group which increase with the distance of the slot from the center line, a main winding and an auxiliary winding disposed in said slots, each of said windings including a plurality of coil groups, the coil groups of the main winding being placed in the slots of said groups of slots other than the center slots of the groups, and the coil groups of the auxiliary winding being placed in slots of adjacent groups of slots with the outermost coils of each coil group lying in the center slots of the slot groups.

5. A stator member for a single-phase electric motor comprising a laminated core having a plurality of equally spaced, generally radial slots for the reception of windings, all of said slots being of the same radial depth, said slots being arranged in a plurality of identical groups, the slots of each group being symmetrical with respect to the radial center line of the group, the area of said slots increasing with the distance of the slot from the center line of the group, the outermost slots of each group being common with the adjacent groups and being of trapezoidal cross-section, a main winding and an auxiliary winding disposed in said slots, each of said windings including a plurality of coil groups, the coil groups of the main winding being placed in the slots of said groups of slots other than the center slots of the groups, with the outermost coils of two adjacent coil groups in each of said trapezoidal slots, and the coil groups of the auxiliary winding being placed in slots of adjacent groups of slots with the outermost coils of each coil group lying in the center slots of the slot groups.

References Cited in the file of this patent

UNITED STATES PATENTS

| | | |
|---|---|---|
| 1,326,340 | Hellmund | Dec. 30, 1919 |
| 2,795,712 | Suhr | June 11, 1957 |
| 2,830,209 | Fleckenstein | Apr. 8, 1958 |